Jan. 5, 1932.　　　　　W. C. WEBER　　　　　1,839,430
FEED SPLITTER
Filed June 20, 1929　　　2 Sheets-Sheet 1
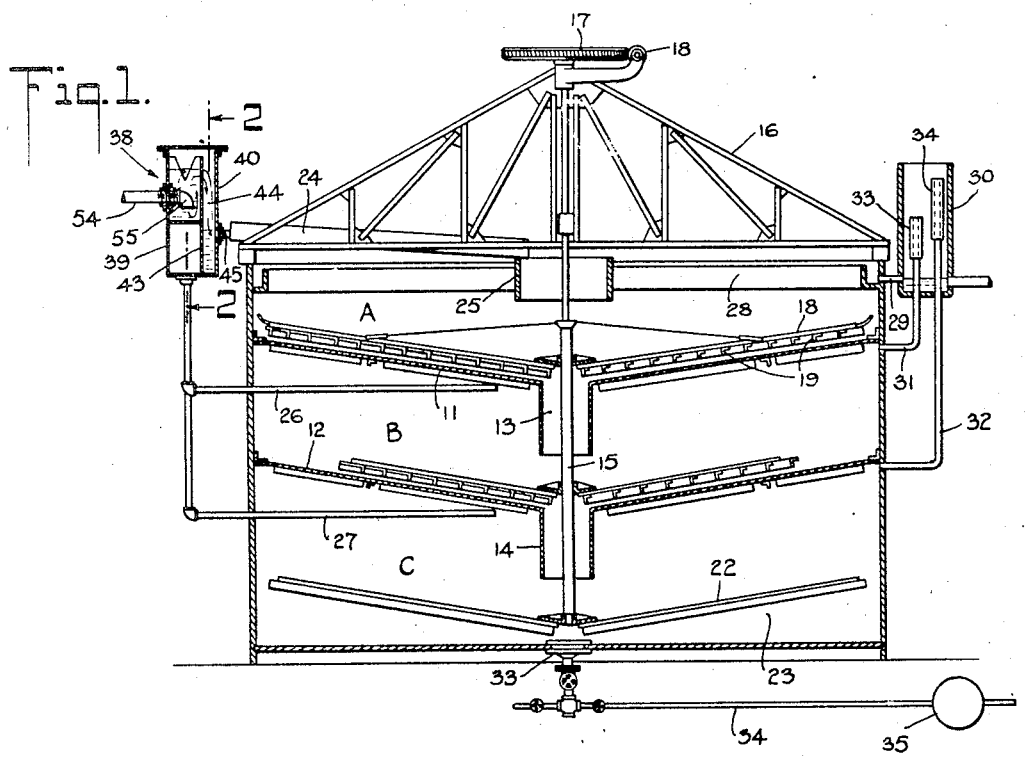
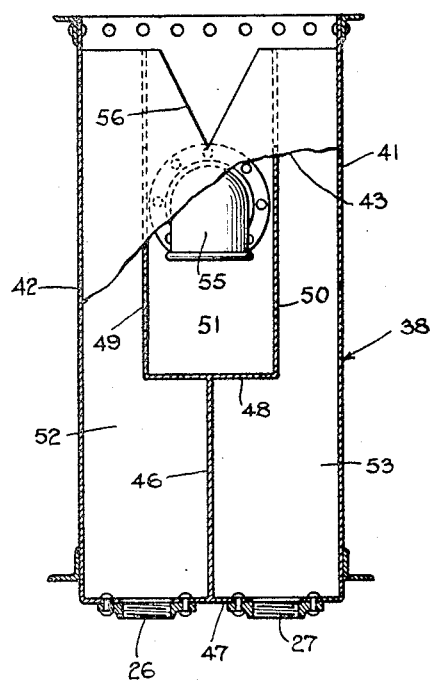
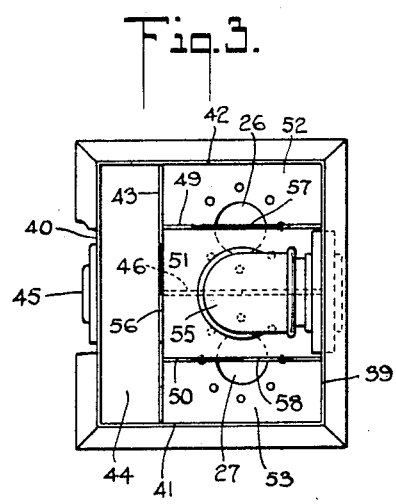
INVENTOR
William C. Weber
ATTORNEY Jan. 5, 1932. W. C. WEBER 1,839,430
FEED SPLITTER
Filed June 20, 1929 2 Sheets-Sheet 2
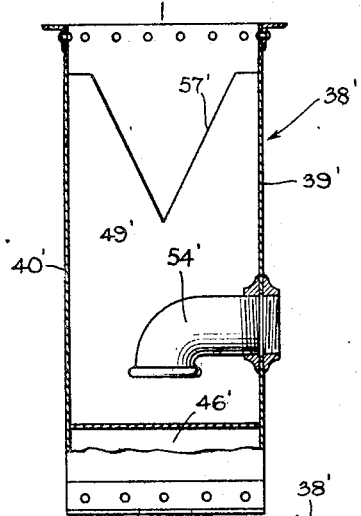
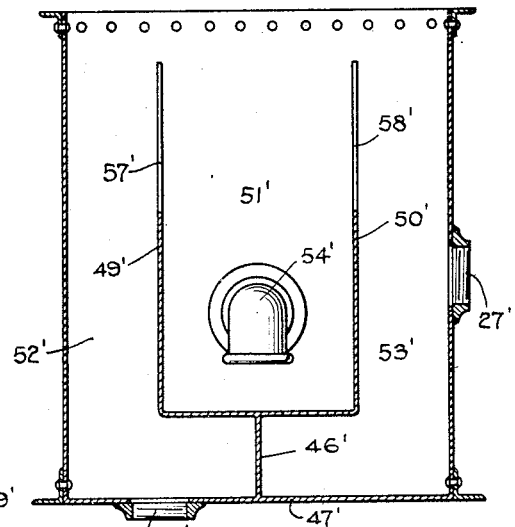
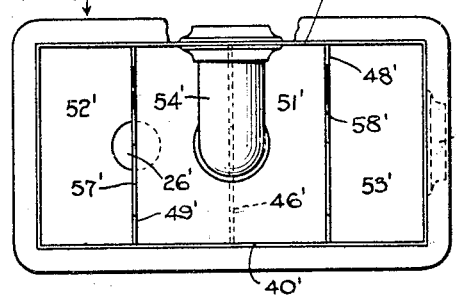
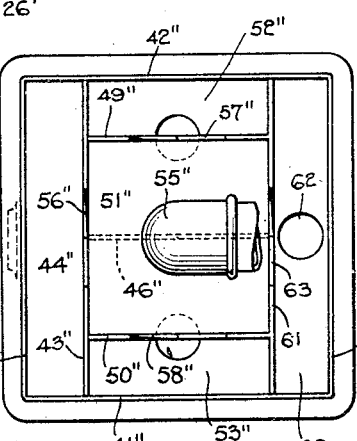
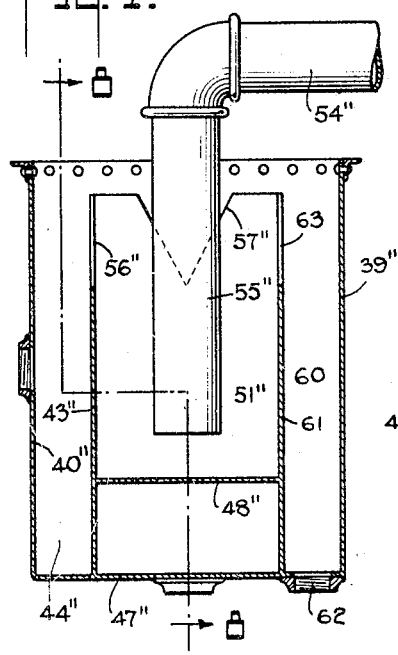
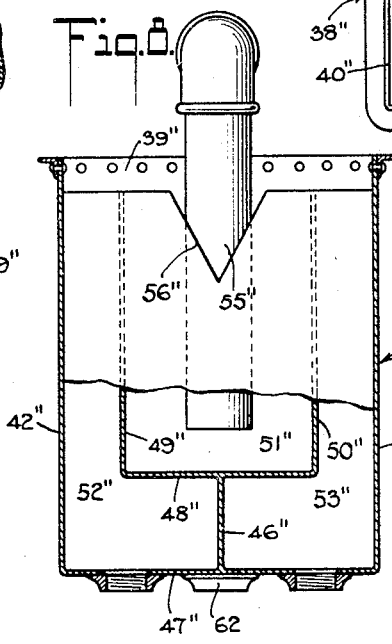
INVENTOR
William C. Weber
BY Geo. G. Hyde
ATTORNEY Patented Jan. 5, 1932

1,839,430

UNITED STATES PATENT OFFICE

WILLIAM C. WEBER, OF LARCHMONT, NEW YORK, ASSIGNOR, BY MESNE ASSIGNMENTS, TO THE DORR COMPANY, INC., OF NEW YORK, N. Y., A CORPORATION OF DELAWARE

FEED SPLITTER

Application filed June 20, 1929. Serial No. 372,311.

This invention relates to improvements in devices for subdividing into a predetermined number of equal portions a continuous feed of liquid for treatment in a plurality of units, and is particularly adapted for subdividing the feed to the separate compartments of apparatus known as tray thickeners in which the feed comprises a suspension of solids in liquid, and the solids are removed by sedimentation in a plurality of settling compartments, ordinarily arranged one above the other in a single tank.

In operating tray thickeners of certain types, particularly those in which the settled solids are mechanically impelled to a common discharge passage which communicates with each compartment, it is often important that the feed be divided into absolutely equal parts, since otherwise there is difficulty in preventing objectionable flow between compartments through the solids discharge passage owing to deficiency of feed in one or more of the compartments. Machines of this type handle a relatively large volume of suspended solids, ordinarily referred to as pulp; and the consequent velocity of the feed stream renders it difficult to produce an equal subdivision, since the heretofore known methods involving introduction of partitions, vanes or the like into the stream not only sets up eddies and swirls which vary the uniformity of the split, but also fails to compensate for the difference in velocity between the sides of the feed channel and the center. As this difference varies with changes in the rate of feed, which sometimes occur, such an arrangement is subject to substantial error and variation. If however the feed channel is expanded to reduce correspondingly the rate of flow, then the feed device becomes so large as to be unwieldy and objectionable.

The broad object of this invention is to provide a feed device that is extremely compact yet which will divide the pulp into any desired number of aliquot parts, regardless of the velocity of flow and variations therein. In general this object is attained by providing a feed box into which the feed is introduced preferably by a pipe and in a generally downward direction so that it will impinge upon the bottom of the box or other transverse baffling means and will flow upwardly in the box in a substantially uniform stream, passing out through a number of overflow openings corresponding to the number of subdivisions desired. The symmetrical location of the feed pipe and the overflow notches produces uniform elevation of the feed around the entire upper periphery of the box and consequently assures uniformity of overflow through the various outlets.

A further object of the invention is to provide a feed splitter in which the various components into which the feed is divided will be introduced continuously into the various compartments of a tray thickener, or into other units having varying back pressures without interfering with the operation of the splitter. In tray thickeners of the type mentioned the pulp in each compartment is subjected through the solids discharge passage to a substantial hydraulic pressure which owing to the concentration of solids in the various compartments, is greater than the hydraulic pressure of a column of feed of equal height. Furthermore, this hydraulic back pressure, against which the feed must be introduced, varies with changes in conditions in the tray thickener.

An object of the invention is therefore to provide a feed splitter in which each component overflows into a vertical compartment of sufficient depth to take care of the fluctuations in level of the feed due to variations in back pressure.

Another object is to combine a feed splitting device including the feed box and overflow features above mentioned with the deep receiving compartments in a unitary compact device adapted for convenient mounting adjacent to a tray thickener or other device or devices receiving a plurality of feed streams.

Other objects and advantages of the invention will be apparent from the following description taken in connection with the accompanying drawings in which:

Fig. 1 is a vertical central section through a typical tray thickener and a three-outlet feed box embodying the present invention;

Fig. 2 is an enlarged vertical section on line 2—2 of Fig. 1;

Fig. 3 is a top plan view of the feed splitter shown in Fig. 1;

Fig. 4 is a vertical central section of a modified form of feed box having two outlets;

Fig. 5 is a vertical central section on line 5—5 of Fig. 4;

Fig. 6 is a top plan view of the feed splitter shown in Figs. 4 and 5;

Fig. 7 is a vertical central section of a third form of feed box in which there are four outlets;

Fig. 8 is a section on the line 8—8 of Fig. 7; and

Fig. 9 is a top plan view of the feed splitter shown in Figs. 7 and 8.

Although the feed box or feed splitting means of the present invention may be used for different purposes, it is here shown in connection with a well-known form of Dorr tray thickener. Referring to the drawings, 10 designates a thickener tank in which are mounted upper and lower trays 11 and 12 respectively, the upper of which may be provided with a downwardly extending boot 13 and the lower of which may be provided with a downwardly extending boot 14. The thickener also includes a shaft 15 arranged axially of the tank and supported by the superstructure 16 extending across the top of the tank. This shaft is provided at its upper end with a worm gear 17 which is driven by a worm 18 connected with any suitable source of power.

The present invention relates more particularly to the feed box or means for splitting the feed, of which one embodiment is illustrated in Figs. 1, 2 and 3 and consists of a feed box proper or main feed box 38 having a rear wall 39, that is, the wall farthest from the thickener tank, a front wall 40 and side walls 41 and 42. Extending across the inner side of the feed box 38 is a partition 43 setting off a discharge compartment or box 44 from which fluid flows through a pipe or conduit 45 to the launder 24. Extending centrally from the partition 43 to the rear wall 39 is a partition 46. This partition 46 also extends from the lower wall or bottom 47 of the feed box 38 to a horizontal partition 48 extending from the partition 43 to the rear wall 39 only part of the distance from the partition 46 to each of the side walls 41 and 42 said partition being connected at its side edges with the lower edges of vertical partitions 49 and 50 parallel to the walls 41 and 42 and extending from the partition 43 to the rear wall 39 of the main feed box.

This arrangement provides an inner receiving compartment or chamber 51, an overflow or discharge compartment 44 already referred to, side overflow compartment or box 52 separated from the chamber 51 by wall or partition 49 and discharging through the pipe 26 and an overflow compartment 53 at the other side of the receiving chamber and discharging through pipe 27. The fluid is supplied through a pipe 54 and a downwardly directed spout 55 into the receiving chamber 51 at a point below the normal fluid level and is deflected by the bottom of the compartment toward the side walls thereof so that the fluid flows upwardly along the side walls or peripheral wall of the compartment 51 and overflows into the compartments 44, 52 and 53 through suitable overflow outlets 56, 57 and 58 in the form of V-shaped notches having their vertices at the same level and being of the same shape. It will be seen that, due to the deflection and spreading out of the stream, the velocity or flow will be smoothed out and a substantially smooth discharge through the V-shaped overflow outlets will be obtained. It should also be noted that the discharge compartments 44, 52 and 53 are of such depth as to allow for considerable variation of the fluid level therein to enable an adjustment of the fluid level to obtain the necessary head for overcoming back pressure from compartments B and C of the thickener tank.

In Figs. 4, 5 and 6 there is illustrated another form of feed box 38' in which the feed is split into two parts. This form of feed box has a rear wall 39' through which the influent material passes to a spout 54' and is directed downwardly against the bottom 48' of the receiving chamber 51'. In this form the partitions 49' and 50' at the sides of the receiving chamber extend to the wall 40', thus eliminating the chamber 44 of the feed box shown in Figs. 1, 2 and 3. At the sides of the chamber or compartment 51' there are, however, discharge chambers 52' and 53' separated beneath the receiving chamber 51' by a partition 46' and receiving fluid from the chamber 50' through notches 57' and 58'. The fluid is discharged from the compartments 51' and 52' through outlets 26' and 27' respectively.

In Figs. 7, 8 and 9 there is illustrated a feed box 38" by which the influent stream is split into four parts. In this form there is a rear wall 39", forward wall 40", side walls 41" and 42", and a partition 43" extending across the front part of the feed box and setting off a discharge box or chamber 44". The feed box is also provided with side discharge compartments or chambers 52" and 53" separated from each other by a receiving chamber 51" having side walls 49" and 50" and a bottom wall 48", and also separated by a compartment 46" extending from the bottom wall of the receiving chamber to the bottom wall 47" of the main feed box. The structure thus far described is in general the same as that shown in Figs. 1, 2 and 3, but in this third form of feed box there is an additional discharge compartment 60 set off by a partition 61 across the rear side of the receiving chamber 51″ and side discharge chambers 52″ and 53″ and having at its bottom a discharge outlet 62. In this form the fluid passes from the receiving compartment to the discharge compartments 44″, 52″, 53″ and 60 through outlets 56″, 57″, 58″ and 63, respectively, which are in the form of V-shaped notches as in the other forms described. In view of the additional discharge chamber or compartment 60 at the rear side of the feed box, the conduit 54″ for the influent material preferably is not brought in through the side of the feed box, but from above to deliver the fluid material through the spout 55″ to the receiving chamber at the proper position with reference to the bottom of the receiving chamber, eliminating any interference with upward flow in the feed compartment past the influent pipe.

It should be understood that various changes may be made in the construction and arrangement, and that certain parts may be used without others without departing from the true spirit and scope of the invention.

I claim:

1. A fluid feed splitter including a feed compartment having a plurality of overflow outlets arranged along the upper part thereof, a casing surrounding the compartment and extending substantially below the bottom thereof, and partitions extending from the compartment to the casing between said overflow openings and extending below the compartment, serving to define a plurality of discharge passages for liquid overflowing through said openings.

2. The apparatus according to claim 1 in which a bottom outlet is provided for each of said discharge passages.

In testimony whereof I affix my signature.

WILLIAM C. WEBER.